W. A. COLLINS.
GREEN CORN CUTTER.
APPLICATION FILED NOV. 19, 1915.

1,239,353.

Patented Sept. 4, 1917.
4 SHEETS—SHEET 1.

Witnesses

Inventor
W. A. Collins
By Victor J. Evans
Attorney

W. A. COLLINS.
GREEN CORN CUTTER.
APPLICATION FILED NOV. 19, 1915.
1,239,353.
Patented Sept. 4, 1917.
4 SHEETS—SHEET 2.
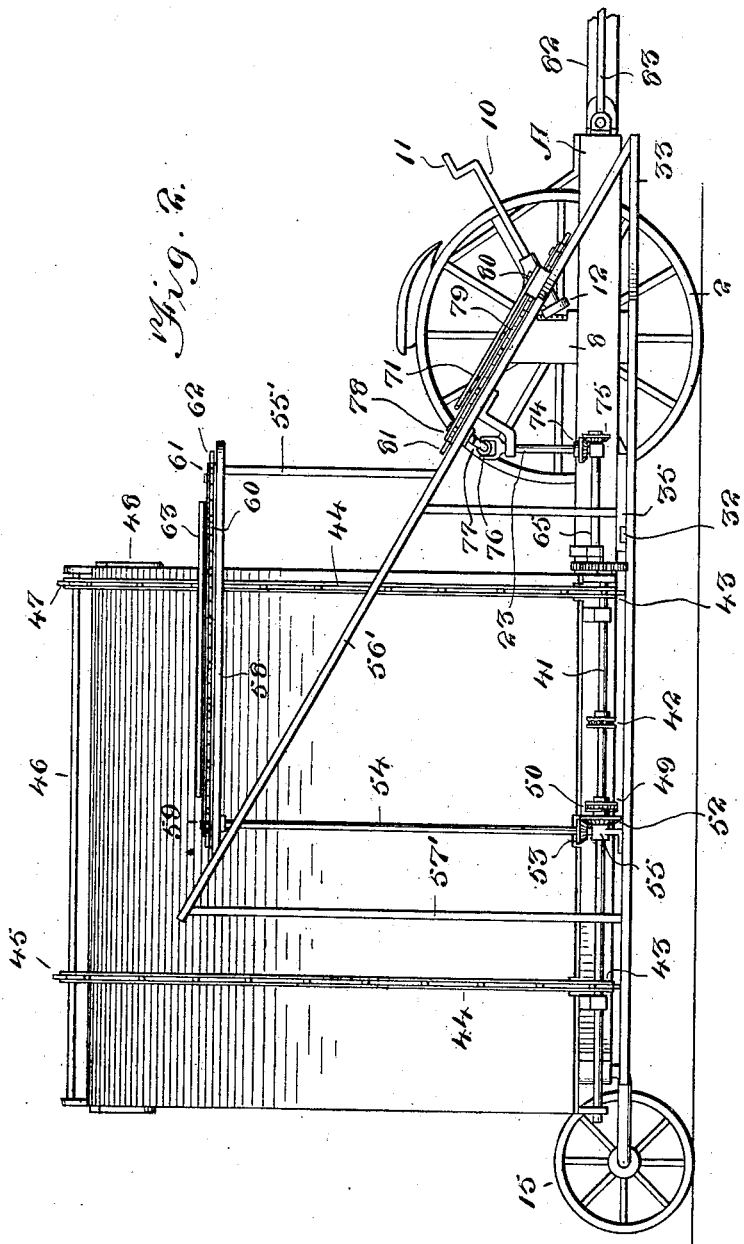
Witnesses
E. R. Ruppert
W. H. Bagger
Inventor
W. A. Collins
By Victor J. Evans
Attorney

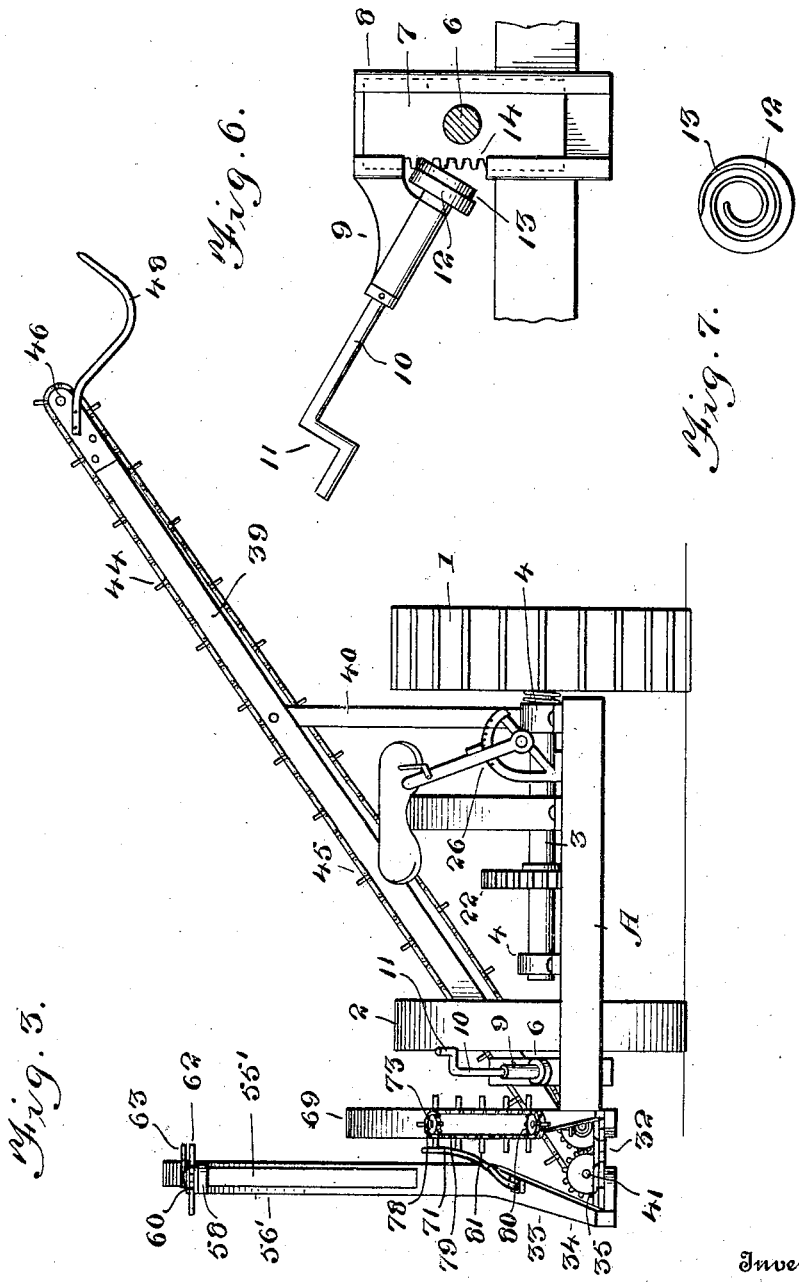

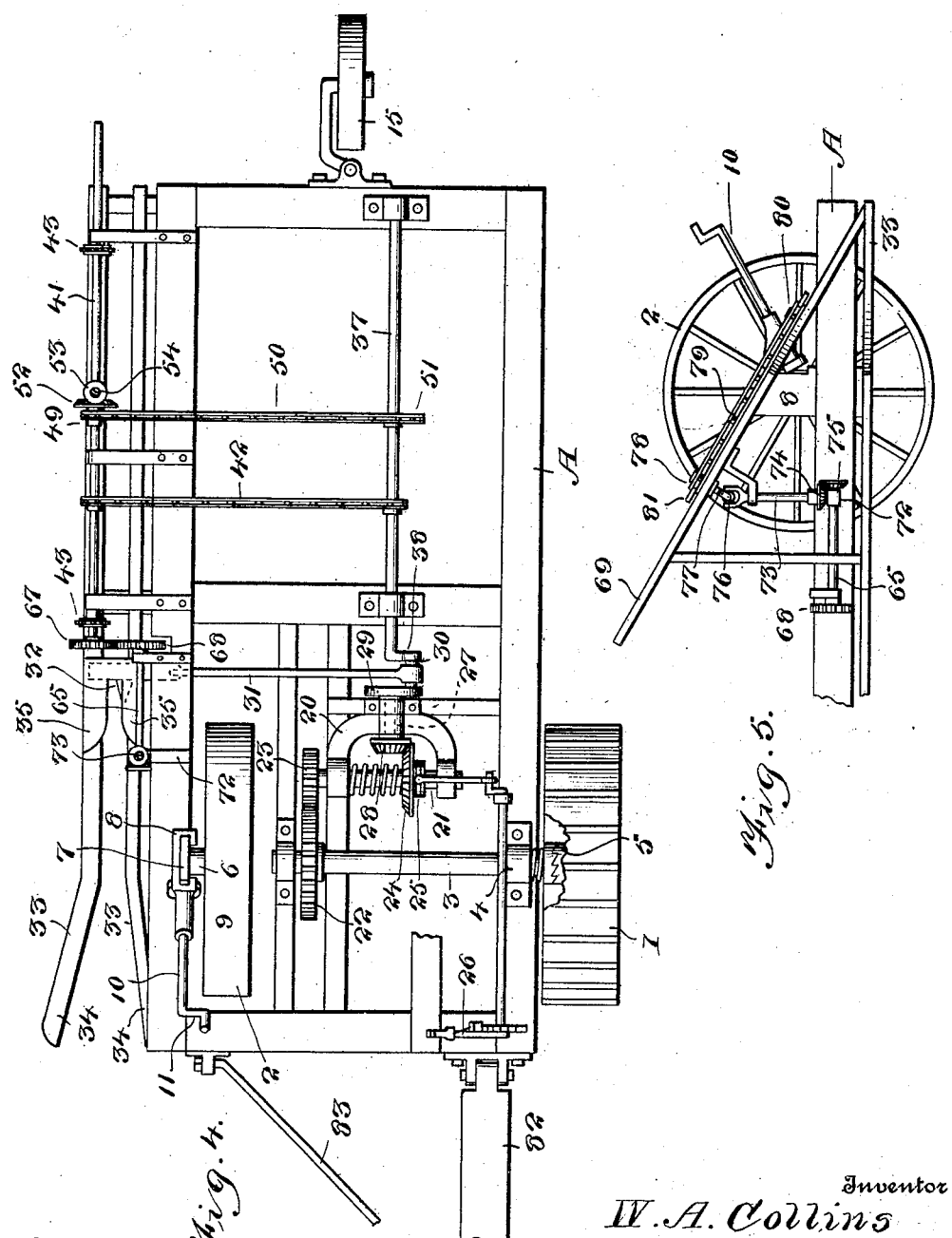

UNITED STATES PATENT OFFICE.

WILLIAM ARTHUR COLLINS, OF KEWANNA, INDIANA.

GREEN-CORN CUTTER.

1,239,353.　　　　Specification of Letters Patent.　　Patented Sept. 4, 1917.

Application filed November 19, 1915. Serial No. 62,398.

*To all whom it may concern:*

Be it known that I, WILLIAM A. COLLINS, a citizen of the United States, residing at Kewanna, in the county of Fulton and State of Indiana, have invented new and useful Improvements in Green-Corn Cutters, of which the following is a specification.

This invention relates to machines for cutting green corn and for elevating the stalks to a convenient height for depositing the same in a receptacle, such as the box of a wagon which is driven alongside of the corn cutting machine.

The invention has for its object to produce an organized machine of simple and improved construction equipped with mechanism deriving motion from the transporting wheels of the machine for cutting the corn stalks, for tilting the same onto a carrier and for elevating the same to the proper height.

A further object of the invention is to produce a machine of the character described in which the elevator frame is equipped with means for receiving and supporting the cut stalks until a proper quantity has accumulated.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Fig. 2 is a side elevation of the same.

Fig. 3 is a front elevation.

Fig. 4 is a top plan view with the elevator removed and with the inclined guides and other parts broken away for the purpose of showing more clearly the subjacent parts.

Fig. 5 is a sectional detail view taken on the line 5—5 in Fig. 1.

Fig. 6 is a sectional detail view taken on the line 6—6 in Fig. 1.

Fig. 7 is a detail face view of the disk having the spiral rib or worm whereby the device for tilting the frame of the machine is operated.

Corresponding parts in the several figures are denoted by like characters of reference.

Figure 1:
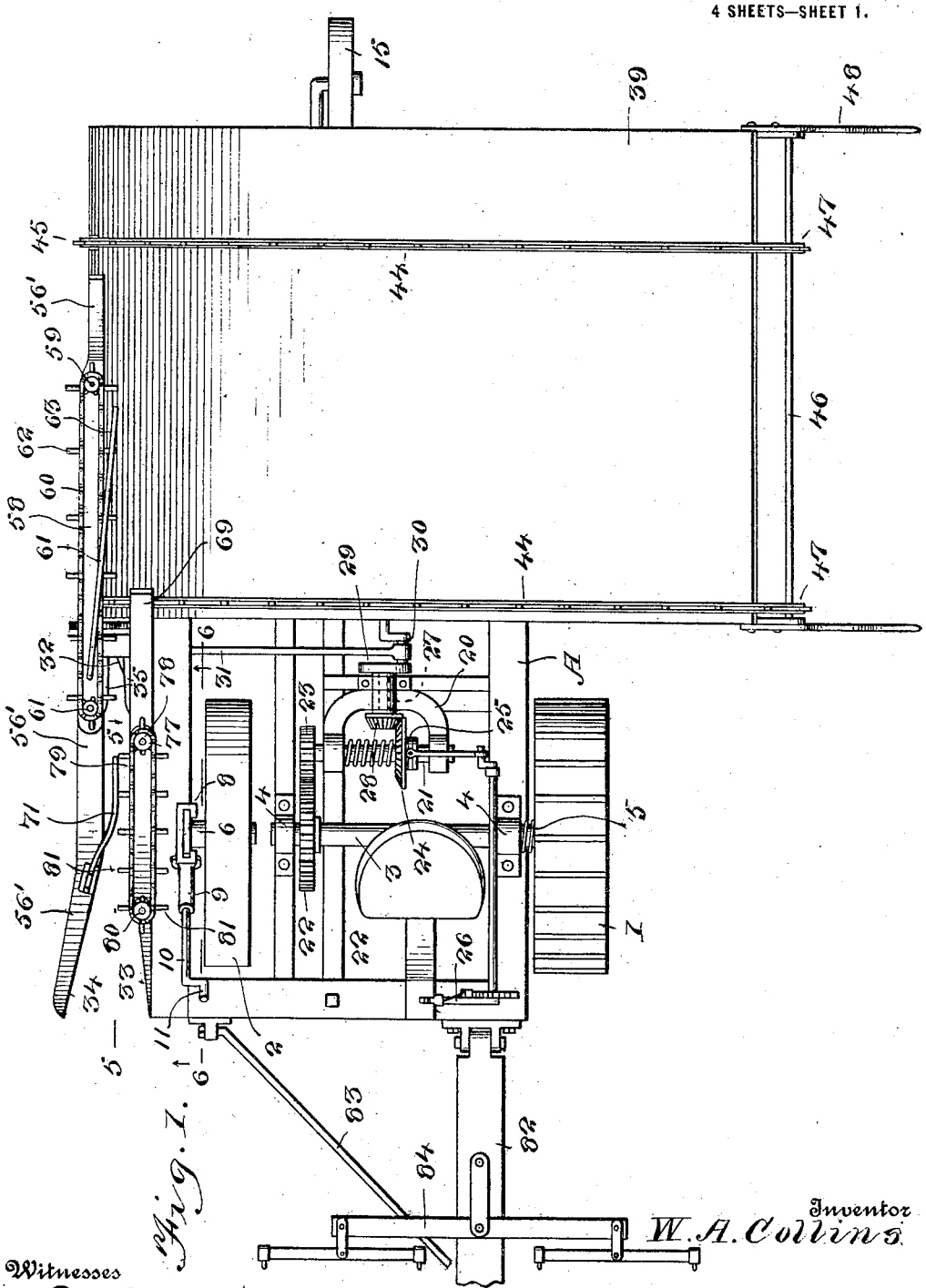
Figure 1 is a top plan view of a machine constructed in accordance with the invention.

The main frame A of the improved machine is supported near its forward end by ground wheels 1, 2, the wheel 1 being a bull wheel or driving wheel mounted on an axle 3 which is supported for rotation in bearing boxes 4 upon the frame, the wheel 1 being connected with the axle by a clutch device conventionally indicated at 5, said clutch device being of ordinary well known construction, whereby the axle will be caused to rotate when the machine is moving in a forward direction, rotation being interrupted if the machine is backed. The ground wheel 2 is supported on a spindle 6 carried by a slide 7 vertically movable in a housing 8 supported on the frame. The housing 8 has a bracket 9 wherein is journaled a shaft 10 having a crank 11 whereby it may be rotated. Said shaft also has a disk 12 equipped with a spirally disposed rib 13 engaging a rack 14 formed on the slide 7. It will be seen that by rotating the shaft 10 by means of the crank 11 a sliding movement will be effected of the housing 8 relatively to the slide 7, the result of which will be to tilt the frame A, the side of said frame which is supported by the wheel 2 being raised or lowered according to the direction of rotation of the shaft 10. The cutting apparatus carried by the frame, as will be hereinafter described, may thus be raised or lowered to cut or sever the corn stalks at the desired distance above the ground. The rearward part of the frame is supported by a trailer wheel 15.

A U-shaped bracket 20 which is supported on the main frame to the rearward of the axle is provided with bearings wherein a counter shaft 21 is supported for rotation, said counter shaft deriving motion from the axle 3 through the medium of intermeshing gears or spur wheels 22, 23. The counter shaft 21 carries a bevel gear 24 and a clutch device 25 whereby said bevel gear may be thrown into and out of operation, said clutch device being operable by an ordinary shipping lever 26. The U-shaped bracket supports a short shaft 27 which is disposed at right angles to the counter shaft 21, said shaft 27 carrying at one end a bevel pinion 28 meshing with the bevel gear 24. The other or rearward end of the shaft 27 carries a disk 29 provided with a wrist pin 30 which is connected by a pitman 31 with a suitably guided knife or cutter 32 to which a reciprocatory motion will thus be imparted.

The frame of the machine is provided at one side thereof with stalk guides 33 having forwardly divergent portions 34 between which the corn stalks are guided to the cutting mechanism which includes a pair of stationary knives 35, the reciprocatory cutter 32 and conventional guide means on which the reciprocatory cutter is guided.

A longitudinally disposed shaft 37 which is mounted in axial alinement with the shaft 27 is provided with a crank 38 engaging the wrist pin 30, thereby causing the shaft 37 to be rotated in unison with the shaft 27. An elevator frame 39 is mounted on the main frame where the lower end of said elevator frame is supported at one side of the main frame, braces 40 being employed to support the weight of the upper portion of the elevator frame, the latter being mounted in an inclined position across the main frame in rear of the transporting wheels and also to the rearward of the cutting apparatus. A shaft 41 is supported at the lower end of the elevator frame, said shaft being disposed in parallel relation to the longitudinal shaft 37 from which it derives motion by means of a transmission chain 42. The shaft 41 is equipped with sprocket wheels 43 over which the endless conveyer of the elevator is guided, said conveyer including in its construction chains 44, some of the links of which are equipped with prongs 45 to carry the corn stalks upward over the elevator frame, the upper end of which supports a shaft 46 having sprockets 47 over which the chains are guided. The upper end of the elevator frame is provided with V-shaped supports 48 onto which the corn stalks are discharged by the elevator and from which they are removed by the operator who is stationed on the wagon where the stalks are to be loaded.

Supported for rotation on the lower elevator shaft 41 is an idle sprocket 49 that receives motion by means of a transmission chain 50 from a sprocket wheel 51 on the shaft 37, said idle sprocket 49 having associated therewith a bevel gear 52 that meshes with a bevel pinion 53 on an upright shaft 54, said upright shaft having its lower end stepped for rotation in a bearing 55 on the shaft 41, the upper end of the shaft 54 being supported for rotation in the board or guide board 58 which is supported in an approximately horizontal position. The forward end of the reel board 58 is supported on an upright 55' rising from an inclined brace 56' the low end of which is connected with the forward end of the divergent portion 34 of the outermost guide 33, and the rearward end of which is mounted on an upright 57' rising from the frame of the machine. The rearward end of the reel board 58 is supported directly on the brace 56'. The shaft 54 carries a sprocket wheel 59 over which is guided a chain 60 constituting an endless conveyer or reel, the forward portion of which is trained over an idle sprocket wheel 61 which is mounted for rotation on the board 58. Some of the links of the chain 60 are provided with arms or prongs 62 to engage the corn stalks and to tilt the upper portions of said stalks in a rearward direction so that when severed by the cutting apparatus the stalks will drop lengthwise on the lower portion of the endless conveyer of the elevator. Mounted on the reel board 58 is a deflecting arm 63, whereby the stalks as they drop will be disengaged from the arms or prongs of the conveyer which constitutes the reel. The forward end of the arm 63 is fixed to the reel board intermediate the leads of the chain 60, and the said arm extends upward and laterally with respect to the board, the rearward extremity of the arm being spaced from the inner side edge of the board by a distance equal to the length of the prongs 62. It will be understood that in the operation of the machine the stalks that are to be cut are carried rearward between the gathering arms by the action of a conveyer chain to be presently described. The reel chain 60 is provided for the purpose of tilting the upper ends of the stalks rearwardly as soon as the lower ends of the stalks have been severed from the stubs so that the stalks may be dropped lengthwise on the lower end of the elevator. The deflector 63 is provided to safely disengage the stalks from the prongs 62 of the reel chain.

Supported for rotation on the frame of the machine in parallel relation to the lower elevator shaft 41 is a counter shaft 65 which receives motion from the elevator shaft 41 by means of intermeshing gears 67, 68 on the respective shafts. An inclined guide board 69 is connected at its lower end with the forwardly divergent end portion of the innermost guide 33, the upper or rearward portion of said guide member 69 being supported on the elevator frame or on some other suitable part of the framework of the machine. The inclined brace 56' carries a resilient deflector 71. Stepped in a bearing 72 which supports one end of the counter shaft 65 is the lower end of an upright shaft 73, said shaft having a bevel pinion 74 meshing with a bevel gear 75 on the counter shaft. The upper end of the upright shaft 73 is connected by a universal joint 76 with a shaft 77 which is supported for rotation in the inclined guide board 69 at right angles to the face of the latter, said shaft 77 carrying a sprocket wheel 78 over which is guided an endless conveyer chain 79, said chain being also trained over an idle sprocket 80 near the lower end of the guideboard 69. The conveyer chain 79, or some links of said chain, will be provided with outwardly extending fingers 81 to engage the corn stalks which will be moved or tilted in the direction of the conveyer chain by the action of the resilient deflector 71 carried by the inclined brace 56'.

Connected with the forward end portion of the main frame is a tongue 82 having a brace 83 and supporting an evener 84 for the attachment of the draft animals.

In cutting green corn for ensilage it has heretofore been usual to cut the corn by hand, the cut stalks being lifted or handed by the man who cuts it to the operator who is stationed on the wagon and who piles the stalks on the wagon as they are handed to him. Cutting machines are also used which cut the stalks manually, but in which the cut stalks are piled by an operator on the cutting machine until a sufficient quantity has accumulated to form a shock which is then tied and deposited on the ground to be subsequently loaded on a wagon. Other methods have been employed, but all the methods heretofore practised, as far as I am aware, have been wasteful of time and labor apart from the heavy manual work exacted by lifting the stalks which are heavy and unwieldy. By the improved machine which may be drawn by a single team, a row of stalks will be cut and delivered by the elevator to the V-shaped supports 48. It being understood that a wagon is driven alongside the cutting machine it will be readily seen that the V-shaped supports will overhang the wagon box, thus enabling the operator who is stationed on the wagon to remove the stalks whenever a sufficient quantity has accumulated and to load the same properly on the wagon, this work being performed in a comparatively easy manner, because very little lifting is required, and the stalks may be readily loaded in the proper manner. The cutting machine requires the service of only a single operator or driver for whom a seat is provided and, there being no heavy labor to be performed in connection with the cutting machine, the operator may be a young boy. It will thus be seen that with my improved machine by slight expenditure of manual labor green corn may be cut, elevated and stored on a wagon or receptacle to be subsequently disposed of in the customary manner.

Having thus described the invention, what is claimed as new, is—

1. In a machine of the class described, a main frame, a wheel carrying axle supporting the forward portion of said frame, said axle being mounted for rotation, a U-shaped bracket supported on the frame, a counter shaft supported by the bracket and deriving motion from the axle, a shaft supported on the U-shaped bracket at right angles to the counter shaft, and deriving motion from said counter shaft, clutch means whereby the motion may be interrupted, a disk on the shaft that receives motion from the counter shaft, said disk having a wrist pin, a cutting apparatus including a reciprocatory cutter, and a pitman for driving the same, said pitman being connected with the wrist pin, a longitudinally disposed shaft having a crank connected with the wrist pin and driven thereby, and an elevator deriving motion from the longitudinal shaft.

2. In a machine of the class described, a wheel supported main frame, stalk guides supported adjacent to one side of the frame and having forwardly divergent front portions, stationary cutters adjacent to the rearward ends of the stalk guides, a reciprocatory cutter supported for operation in conjunction with the stationary cutters, means for actuating the reciprocatory cutter, said means deriving motion from supporting wheels of the machine and said means including a longitudinally disposed shaft carrying a crank disk, a second longitudinal shaft having a crank engaging the wrist of the crank disk, an elevator including an endless carrier, and shafts over which said carrier is trained, means for transmitting motion to one of said shafts from the second longitudinal shaft, a guide- or reel-board, an endless chain supported adjacent to the upper face of the reel-board and constituting a stalk engaging reel, and means for transmitting motion to said reel from the driven elevator shaft.

3. In a machine of the class described, a wheel supported main frame, stalk guides supported adjacent to one side of the frame and having forwardly divergent front portions, stationary cutters adjacent to the rearward ends of the stalk guides, a reciprocatory cutter supported for operation in conjunction with the stationary cutters, means for actuating the reciprocatory cutter, said means deriving motion from supporting wheels of the machine and said means including a longitudinally disposed shaft carrying a crank disk, a second longitudinal shaft having a crank engaging the wrist of the crank disk, an elevator including an endless carrier, and shafts over which said carrier is trained, means for transmitting motion to one of said shafts from the second longitudinal shaft, a horizontally disposed reel-board, an endless chain supported adjacent to the upper face of the reel-board and constituting a stalk engaging reel, and means for transmitting motion to said reel from the driven elevator shaft, said means including an upright shaft, a bearing on the driven elevator shaft in which said upright shaft is stepped, and intermeshing bevel gears on the driven elevator shaft and the upright shaft.

4. In a machine of the class described, a main frame, supporting means for the same including a revolving front axle, ground wheels on said axle and a trailer wheel, cutting apparatus mounted on the frame and including a reciprocatory cutter, means for transmitting motion to said cutter from the front axle, an elevator positioned to the rearward of the cutting apparatus and including a frame extending transversely across the main frame, a driven shaft at the lower end of said frame, an idler shaft at the upper end of the frame, and an endless conveyer guided over the two shafts, stalk guides arranged at the lower end of the elevator forwardly of the cutting apparatus and having forwardly divergent front portions, a horizontally disposed reel-board, an endless conveyer chain or reel chain supported on the guide board, some of the links of said reel chains having stalk engaging prongs, a deflecting arm fixed on the reel board near the front end thereof, said arm extending upwardly and laterally beyond the side edge of the reel board and terminating beyond the prongs, means for driving said chain, an inclined guide board having its low end connected with the forward portion of one of the stalk guides, an endless conveyer chain supported adjacent to the upper face of the inclined guide board, means including a counter shaft for transmitting motion to the said conveyer chain from the driven elevator shaft, and a resilient deflector connected with the other stalk guide and extending in the direction of the conveyer chain.

5. In a machine of the class described, a main frame, supporting means for the same including a revolving front axle, ground wheels on said axle and a trailer wheel, cutting apparatus mounted on the frame and including a reciprocatory cutter, means for transmitting motion to said cutter from the front axle, an elevator positioned to the rearward of the cutting apparatus and including a driven shaft receiving motion from the axle, stalk guides arranged at the lower end of the elevator forwardly of the cutting apparatus and having forwardly divergent front portions, a horizontally disposed reel-board, supporting means for said reel-board including an inclined brace connected at its low end with the forward end of the outermost stalk guide, an endless conveyer chain or reel chain supported on the guide board, some of the links of said reel chains having stalk engaging prongs, a deflecting arm fixed on the reel board near the front end thereof, said arm extending upwardly and laterally beyond the side edge of the reel board and terminating beyond the prongs, means for driving said chain, an inclined guide board having its low end connected with the forward portion of the innermost stalk guide, an endless conveyer chain supported adjacent to the upper face of the inclined guide board, means including a counter shaft for transmitting motion to the said conveyer chain from the driven elevator shaft, and a resilient deflector connected with the inclined brace and extending in the direction of the conveyer chain.

6. In a machine of the class described, a reel-board, an endless reel chain supported in proximity thereto, means for driving the reel chain, and a deflecting arm connected with the reel-board near the front end thereof, said arm extending laterally beyond one side of the reel board and terminating forwardly of the rear end thereof, some of the links of the reel chain being provided with outwardly extending arms and the deflector being disposed with its free end clear of said arms to discharge stalks therefrom.

In testimony whereof I affix my signature in presence of two witnesses.

WILLIAM ARTHUR COLLINS.

Witnesses:
  Wm. M. Collins,
  Harry Garman.

Copies of this patent may be obtained for five cents each, by addressing the "Commissioner of Patents, Washington, D. C."